United States Patent [19]
Ferraro et al.

[11] Patent Number: 4,962,798
[45] Date of Patent: Oct. 16, 1990

[54] BUOY DEPLOYMENT SYSTEM

[75] Inventors: John R. Ferraro, Clinton; Philip P. Foerster, Waterbury; Peter T. Greenstreet, Sandy Hook, all of Conn.; Steven R. Schwarz, Cranbury, N.J.; Milton R. Turgeon, Enfield, Conn.

[73] Assignee: United Technologies Corporation, Hartford, Conn.

[21] Appl. No.: 250,783

[22] Filed: Sep. 28, 1988

[51] Int. Cl.⁵ .......................... B64D 1/10; B64D 1/12
[52] U.S. Cl. ................................. 244/137.1; 221/153; 89/1.51
[58] Field of Search ............... 244/137.1, 137.4, 118.1; 89/1.51; 367/3, 4, 5; 221/153, 250, 289, 295, 231, 224; 292/144

[56] References Cited

U.S. PATENT DOCUMENTS

| | | | |
|---|---|---|---|
| 1,237,890 | 8/1917 | Fernandez | 89/1.51 |
| 1,721,883 | 7/1929 | Monteith | 89/1.51 |
| 1,980,375 | 11/1934 | Bradshaw | 89/1.51 |
| 2,214,724 | 9/1940 | Ring et al. | 89/1.51 |
| 2,379,383 | 6/1945 | Steel | 89/1.51 |
| 2,405,752 | 8/1946 | Minshall et al. | 89/1.51 |
| 2,707,904 | 5/1955 | Strunk et al. | 89/1.51 |
| 2,750,842 | 6/1956 | Myers | 89/1.51 |
| 2,952,489 | 9/1930 | Johnson | 89/1.51 |
| 3,021,758 | 2/1962 | Somerville et al. | 89/1.51 |
| 3,486,715 | 12/1969 | Reams | 244/137.1 |
| 4,263,835 | 4/1981 | Dragonuk | 89/1.51 |
| 4,397,433 | 8/1983 | Guitcat | 244/118.1 |

Primary Examiner—Galen Barefoot
Attorney, Agent, or Firm—McAuley Fisher Nissen & Goldberg

[57] ABSTRACT

A buoy deployment system for an aircraft is disclosed which includes a multi-store gravity launching system which allows for discharge of different lengths and types of buoys. The gravity launch system includes a plurality of launch tubes, each including a spring biased door at the discharge end thereof, with the doors being either electrically actuated from the pilot cockpit via electrical controls, or, in the event of an electrical malfunction, being manually operable by an operator. Each buoy loaded therein is accessible for reconfiguration in flight, with each tube similarly being reloadable in flight. Also disclosed is a rotatable storage carousel including a plurality of semi-cylindrical tube section/latch assemblies, sized to restrain a plurality of buoys, which form storage stations on the carousel. The storage carousel maximizes the number and type of buoys which may be carried in a given space, being manually rotatable to allows access for setting the operational functions of the buoys contained therein. Utilizing the gravity launcher and storage carousel provides maximum mission flexibility while minimizing aircraft space requirements.

14 Claims, 6 Drawing Sheets

FIG. 3A
FIG. 4
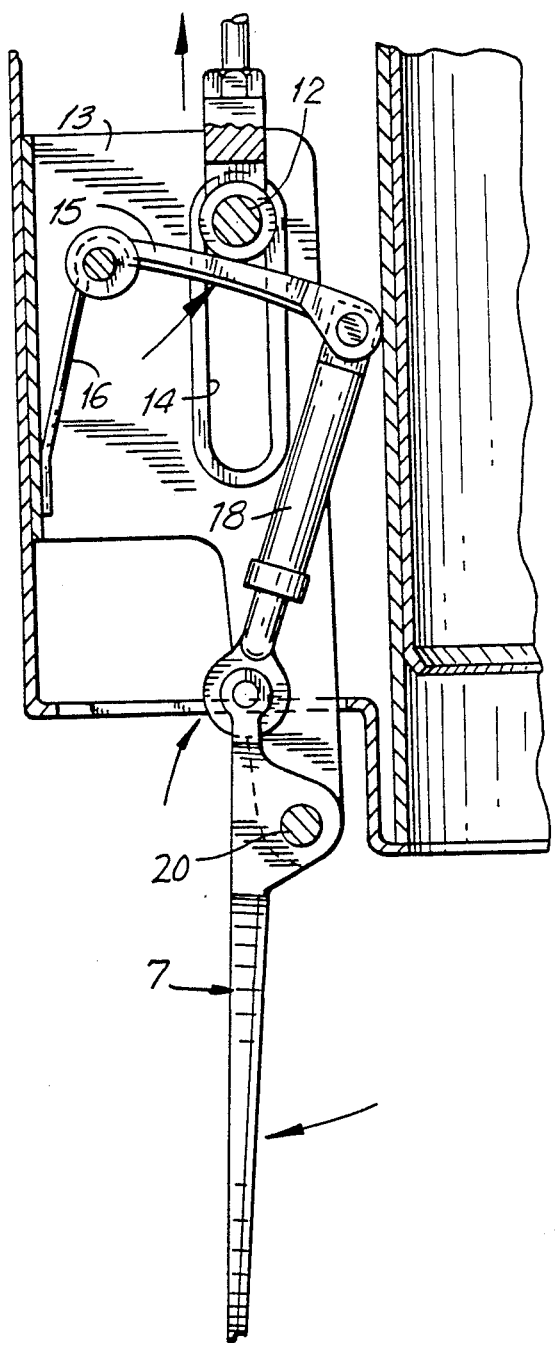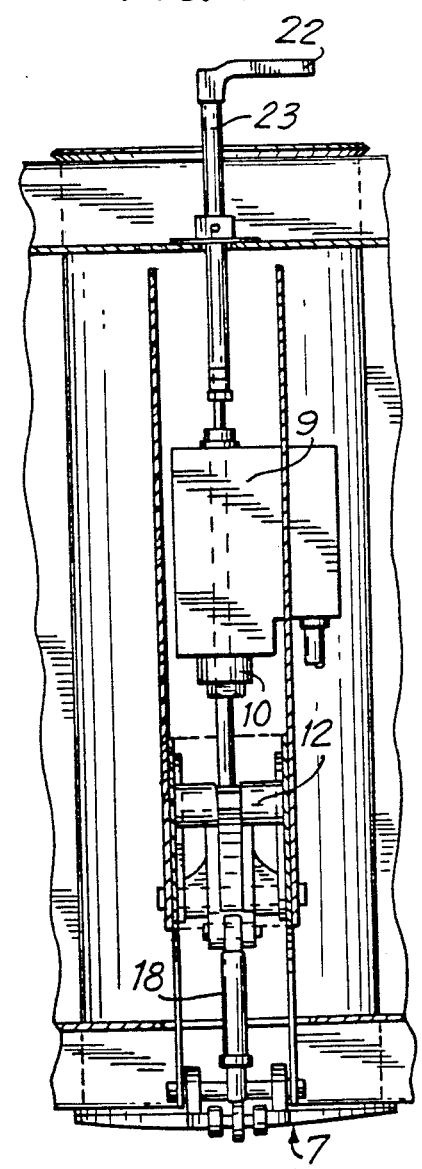

BUOY DEPLOYMENT SYSTEM

The invention was made with Government support under a contract awarded by the Department of the Navy. The Government has certain rights in this invention.

TECHNICAL FIELD

This invention relates to buoy deployment systems and more particularly to multi-store gravity launchers for aircraft based buoy deployment systems including a multiple cartridge storage carousel.

BACKGROUND

Sonobuoys are devices which are deployed into the ocean for detecting the presence of submarines or other underwater vessels by either listening for noise generated by the submarine or by emitting a sonar type signal and listening for a return echo. By deploying a number of sonobuoys in a particular fashion, a given area can be essentially cordoned off and any submerged vessels within that area detected. Generally, the most efficient means for deploying such sonobuoys are by launching from helicopters or fixed-wing aircraft which may deploy the buoys and loiter in the area to monitor the signals issued from the buoys and mark the location of any vessels detected. In addition to sonobuoys, other buoys may be deployed by aircraft, such as marker buoys which provide a smoke or a coloring agent along the ocean surface for position reference, or chaff buoys which may generate a cloud of metallic particles along the surface of the ocean for diverting radar guided devices away from the aircraft or friendly ships. All these buoys are cylindrically shaped having a generally common diameter of about 5 inches and are generally available in 1, 2 and 3 foot lengths, depending on the type of buoy required for a particular application.

Deploying the various buoys may include the steps of selecting the type of buoy, setting any particular parameters such as time delays, frequencies, or the like, loading the buoy into a deployment compartment and launching the buoy over the desired location. With conventional launching systems, the foregoing steps of selecting, setting and loading are generally performed while the aircraft is still on the ground as there is typically no access to the buoys once airborne. Conventional launching systems are usually of the pneumatic or explosive cartridge type, with the pneumatic systems employing gas pressure to charge a buoy containing tube, with the gas pressure propelling buoy away from the aircraft, and the cartridge system utilizing an explosive charge for propelling the buoy. Such systems do not provide for mission flexibility, as once loaded and airborne, the mission is either executed as planned or aborted.

An alternative to the pneumatic and cartridge systems includes gravity launch systems which simply drop the buoy through a chute from the bottom of the aircraft. Such gravity feed systems have included spring loaded trap doors which open in response to the weight and momentum of the buoy, allowing the buoy to free fall to the ocean surface. Such systems have been limited to low air speed operation in order to avoid contact of the buoy with aft structures on the aircraft during discharge. For example, antennas, landing gear and rear airfoil stabilizers may be damaged if the forward air speed allows the buoy to contact these surfaces during discharge. Utilizing a spring-loaded door, biased in the closed position, slows the initial descent velocity of the buoy, further increasing the potential for contact. Consequently, this system requires a further reduction in forward air speed to provide a margin of safety. The gravity systems are also similar to the pneumatic or cartridge type systems, requiring preselecting functions and loading the buoys while on the ground and therefore have not added to mission flexibility.

Consequently, the search continues for buoy deployment systems which maximize flexibility in the type of buoy to be discharged without requiring landing and reloading of the aircraft, while minimizing space requirements.

SUMMARY OF THE INVENTION

It is an object of the present invention to provide a buoy deployment system for an aircraft which allows in-air setting and organization of various buoys for discharge, providing maximum flexibility in selecting buoys for various missions.

It is a further object of the present invention to provide a buoy deployment system which minimizes space requirements on an aircraft.

It is a further object of the present invention to provide a launching system which does not rely on pneumatic or explosive discharge systems yet does not require significant reductions in air speed during deployment.

It is yet another object of the present invention to provide a gravity launch system which is manually operable should there be an electrical system or actuator system failure.

It is yet another object of the present invention to provide a storage system which maximizes the quantity and variety of buoys which can be deployed by an aircraft while providing ease in on-board loading the buoys into a launcher located on the aircraft.

According to the present invention, a buoy deployment system is disclosed which includes a gravity launcher comprising a plurality of tubes, each tube sized to accept a buoy therein, each tube having open upper and lower ends thereof. The open upper end provides access to the buoys placed in the tubes for adjusting settings, and provides for reloading of the tubes in-flight. The lower ends of the tubes extend through the floor of the aircraft. The launcher is preferably located at a far forward end of the aircraft cabin for providing the maximum drop time for buoys deployed therefrom before nearing aft structures. The launcher further includes door means provided at the lower (discharge) end of the tubes, with actuating means connected to the door means for allowing discharge and reloading of the tubes. A manual override system is also included for opening and closing the door means on actuator failure. The deployment system also includes a storage system for carrying a plurality of buoys on an aircraft. The storage system includes a rotatable carousel having a plurality of storage stations with mounting means provided for rotatably supporting the carousel in the aircraft. Restraining means are also included, disposed at each storage station, for releasably holding one or more buoys therein, with the restraining means providing access to the buoys. The carousel also includes locking means for locking the rotatable carousel at a desired storage location. Generally, the storage carousel is disposed adjacent to the gravity launcher allowing an operator to rotate the carousel to a particular station to allow access to a particular buoy. The operator then makes the appropriate settings, removes the buoy and disposes the buoy in one of the plurality of launch tubes. The buoy may then be deployed by the pilot through electrical means or, should there be an electrical launch mode malfunction, the operator may manually launch the buoy via a mechanical backup system.

DETAILED DESCRIPTION OF THE DRAWINGS

FIG. 4 is another enlarged sectional view of the door operating mechanism taken along the line 4—4 of FIG. 3.

DETAILED DESCRIPTION OF THE INVENTION

Figure 1:
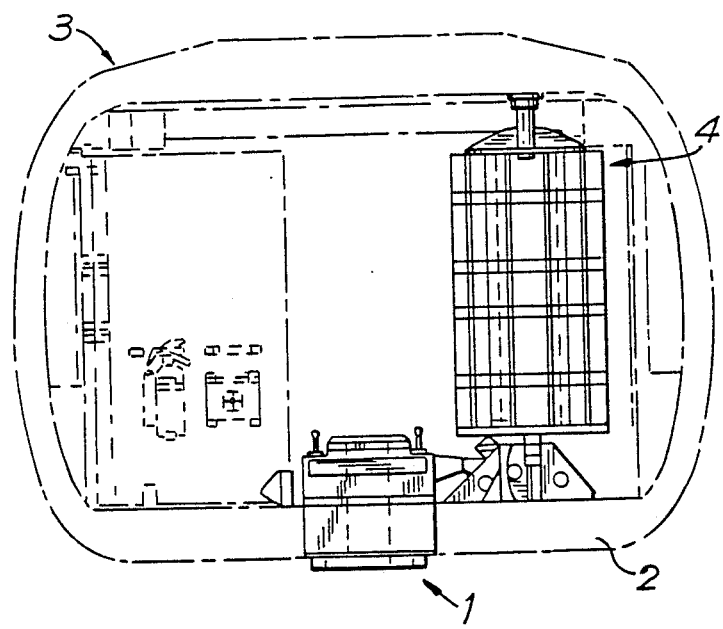
FIG. 1 is a prospective view of the buoy deployment system of the present invention disposed in an aircraft.

Referring to FIG. 1, the buoy deployment system of the present invention is shown disposed in an aircraft. A launcher 1 extends through the floor 2 of an aircraft 3, with a storage carousel 4 mounted adjacent thereto. For exemplary purposes, the deployment system is shown in a helicopter, which is the aircraft most likely to require such a system. However, it will be understood by those skilled in the art that other aircraft could utilize the buoy deployment system of the present invention. In addition, while various buoys such as marker buoys, sonobuoys and chaff buoys are discussed in the specification, it will be understood by those skilled in the art that various other devices may be discharged from the deployment system of the present invention without varying from the scope therefrom. In fact, one of the advantages of the present invention is the ability to discharge various weight and shape devices, limited only by launch tube diameter.

Figure 2:
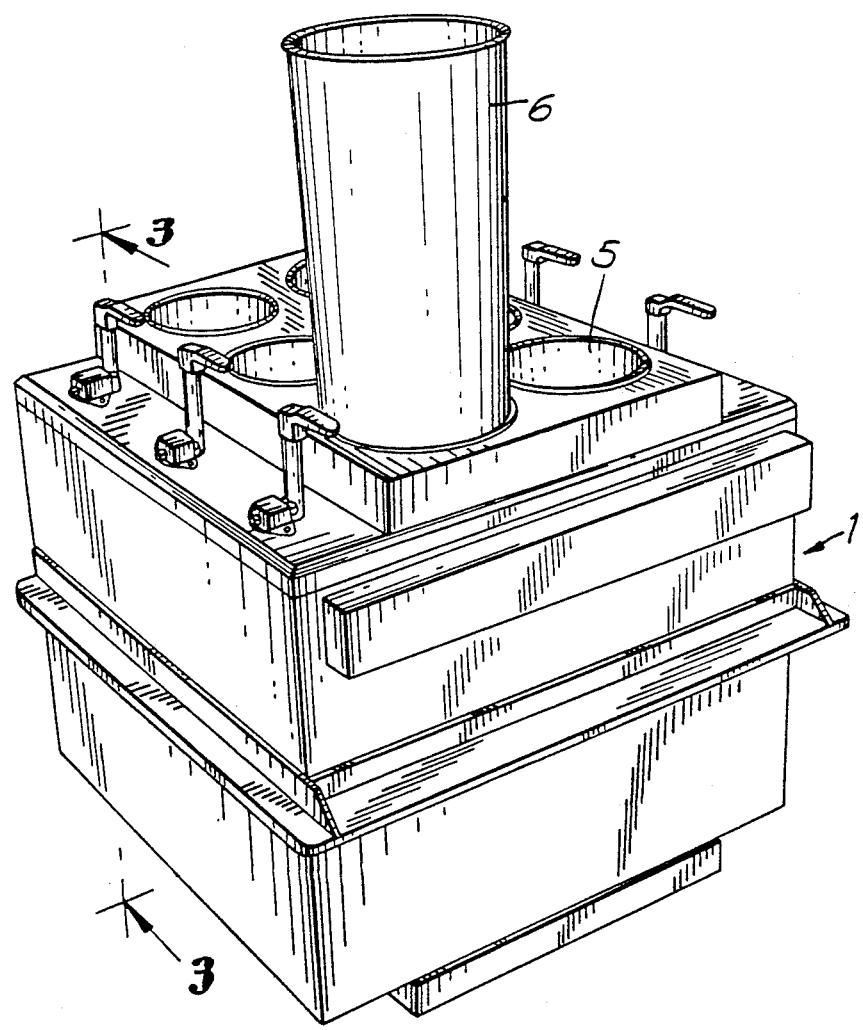
FIG. 2 is a prospective view of the multi-store gravity launcher shown in FIG. 1.

Referring to FIG. 2, the multi-store gravity launcher 1 is shown including a plurality of launch tubes 5 which comprise cylinders having a diameter approximating the diameter of the buoys to be discharged therefrom. The launcher 1 includes six launch tubes, each tube comprising an open-topped cylinder for disposal of the buoys therein. The launcher is termed "multi-store" as the tubes may be used as storage for an additional compliment of buoys.

Each tube may also include an extender 6 which is a tube of slightly smaller diameter which is movable within the tube 5. The extenders 6 may be pulled up in order to increase the effective length of the launch tube. The extender 6 functions as a restraint for a wind-flap which is used to activate the buoy's retarding device, normally a parachute, following deployment from the aircraft.

Figure 3:
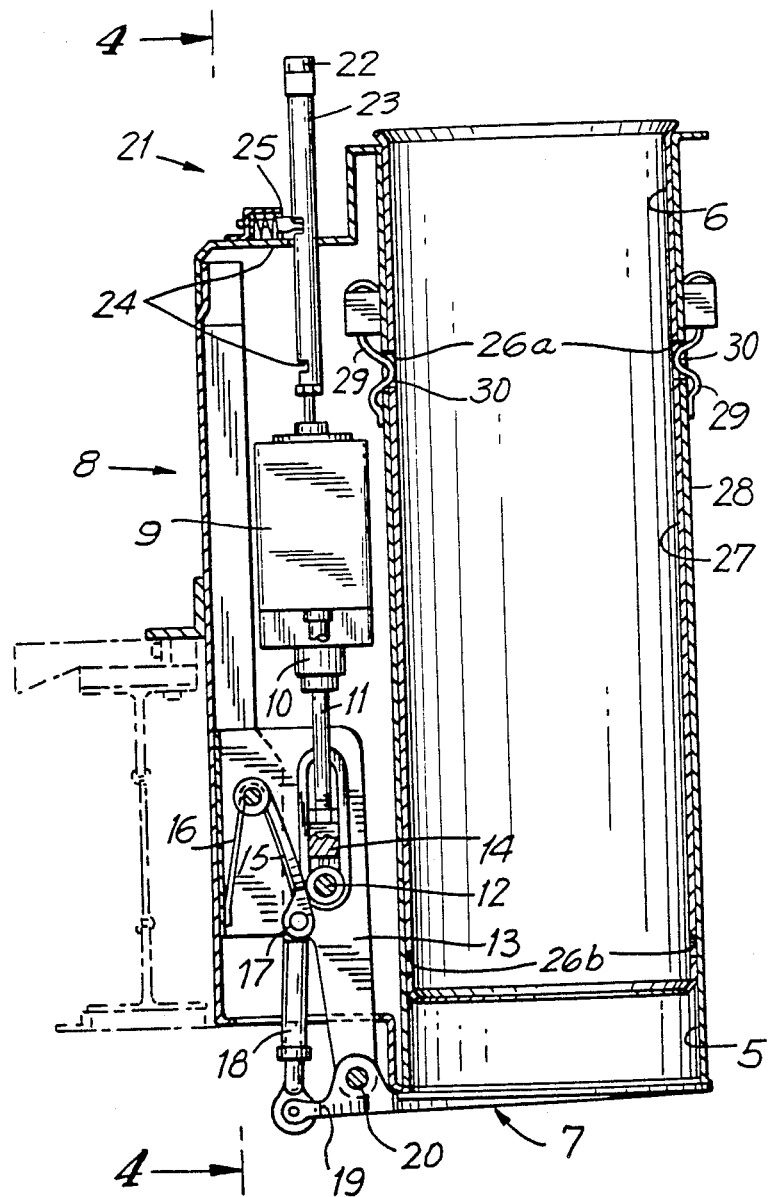
FIG. 3 is an enlarged sectional view of the door operating mechanism for the multi-store gravity launcher of FIG. 2, with FIG. 3a an enlarged view showing the door in the open position.

Referring to FIG. 3, each tube 5 includes a door 7 disposed at the discharge end thereof, with the door connected to an actuator system 8 which is responsive to operator commands. For example, the system may include an electric, pneumatic or hydraulic actuator which is responsive to signals from a pilot control system. For illustrative purposes, the actuator system includes an electric actuator 9, which has a reciprocating piston 10, connected by a shaft 11 to a cam follower 12. The cam follower 12 moves reciprocally in response to the action of piston 10, within a guide plate 13 including a vertical slot 14 therein for restricting movement of the cam follower to the up/down direction. The cam follower may comprise rollers which contact and ride on a cam link 15 which includes a spring arm 16 for biasing the cam into contact with the follower. The cam link 15 is connected by a pin 17 to a lever arm 18 which is further connected to an end of a door flap 19. The door flap 19 is secured by a pin 20 to the guide plate 13 and is pivotable thereabout. The door flaps are preferably oriented such that they open parallel to the forward air flow to minimize interference during buoy discharge. FIG. 3a shows the door in the open position, with the cam link fully biased, while FIG. 4 shows the actuator system in a side view.

The multi-store launcher further includes a manual override system 21 which allows an operator to manually displace the actuator 9 and piston 10 as a unit, and actuate the door mechanism in the absence of an electrical signal, allowing discharge of buoys when there is an electrical or actuator failure, in any position from fully closed to fully open. The manual override system 21 includes a handle 22 attached to a rod 23 which is connected through the actuator 9 to the piston 10. The rod 23 includes recesses 24 which mate with a locking arm 25 sized to fit the recess 24. To operate this system, the operator rotates the handle 22, which rotates the rod 23, disengaging the rod recess 24 from the locking arm 25. The handle may then be either pulled up or pushed down, depending on the failure position of the door. In displacing the door, the operator is assisted by the force of the spring arm biasing the door in order to open the door, thereby discharging the buoy. Upon release, the operator overcomes the force of the spring arm 16 biasing the door back to the closed position, allowing reloading of the gravity launcher.

Referring still to FIG. 3, The extender 6 is shown in the lowered position. The extender includes upper slots 26a and lower slots 26b in the sidewall 27 thereof. An outside sidewall 28 of the tube 5 includes a pair of springs 29 mounted thereon, with a portion of the springs extending through a pair of passages 30 into contact with the extender 6. The springs are aligned with the slots 26a and 26b, for engagement therewith. In FIG. 3, the extender is shown in the lower/load position. The extender may be raised by pulling up on the tube, displacing the springs 29 from the slots 26a, until the springs align with the slots 26b, entering the slots and locking the extender in the raised/launch position.

While a launcher showing six launch tubes is disclosed, it will be understood by those skilled in the art that from two to twenty launch tubes or more may be utilized with the launcher of the present invention depending on the space available within the designated aircraft. For utilization on a helicopter having limited cabin space, six launch tubes are preferred, provided that additional storage capacity is available to allow reloading of the launch tubes.

In operation, the launcher is used according to the following operational procedure. An operator loads a buoy such as a sonobuoy, chaff buoy or marker buoy into one of the open tubes. If the buoy requires setting adjustments, the operator would normally set them prior to loading into the tube. However, the multi-store launcher of the present invention allows an operator to reset these characteristics with the buoy loaded in the tube or allows rapid removal from the tube for resetting and reloading. If the buoy is longer than the tube, the operator lifts the extender into the locked upper position, designating that the buoy is ready for launching. A pilot, copilot or other person may now select which tube he desires to launch via a launch control panel, with the tube choice dependent on the characteristics of the buoy desired. The pilot or operator may then deploy the buoy by pressing a launch button on a panel which will electrically launch the buoy from the selected tube by actuating the electric actuator previously described. After launch, the operator pushes the inner tube down to its lowered position, and reloads the tube.

If there is an electrical control failure or malfunction which results in an actuator failure with the launch door closed, the operator can manually launch the buoy via the mechanical backup system by rotating the handle 22 for the selected tube from its locked (automatic operation) position and then pulling the handle up, which displaces the actuator piston, opening the launch tube door. Once the buoy has been launched, the operator returns the handle to the down and locked position, allowing the tube to be reloaded for the next buoy launching.

If there is an electrical failure or malfunction which results in an actuator failure with the launch door open, the operator can manually close the launch tube door via the mechanical backup system by rotating the handle 22 for the selected tube from its locked (automatic operation) position and then pushing the handle down, which displaces the actuator piston, closing the launch tube door, and allowing reloading of that tube.

Figure 5:
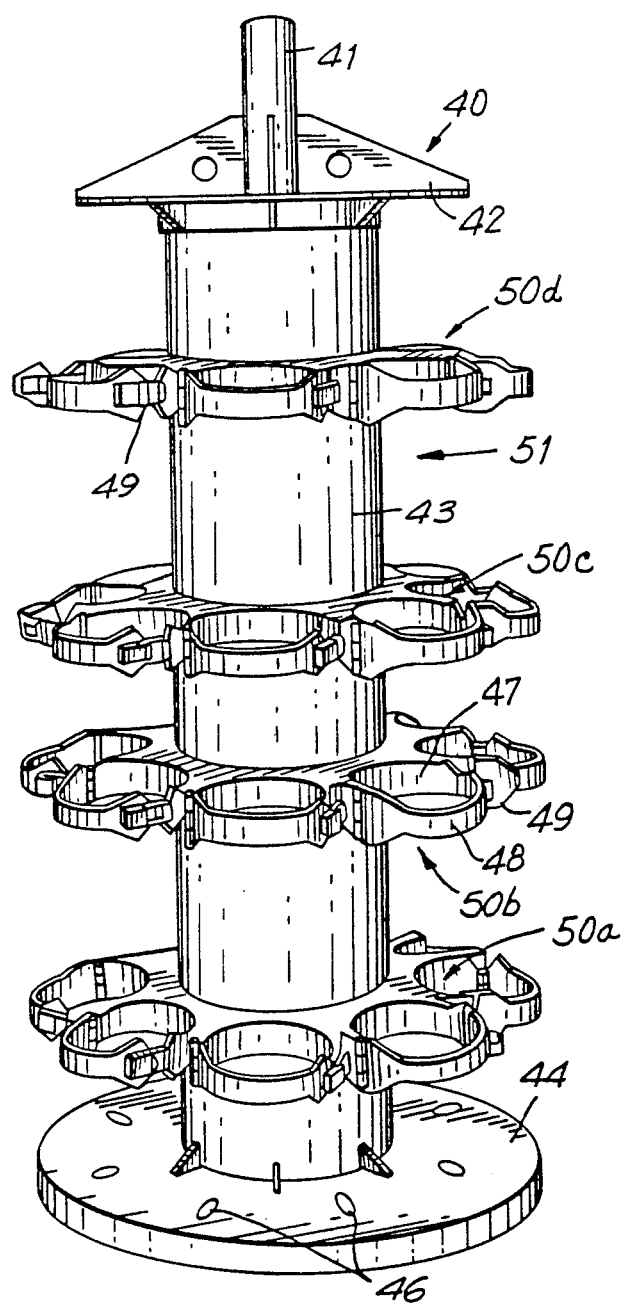
FIG. 5 is a front dismounted view of the storage carousel shown in FIG. 1.

In addition to the multi-store gravity launcher, the buoy deployment system of the present invention includes a buoy storage carousel which is installed in the aircraft cabin. Referring to FIG. 5, a buoy storage carousel 40 is shown which includes an upper shaft 41, connected to a hub 42, with a core 43 extending along the longitudinal axis of the carousel to a platform 44, with a lower shaft 45 (not shown) attached thereto. The platform 44 includes a plurality of locking holes 46 around the periphery thereof.

The carousel 40 includes a plurality of semi-cylindrical tube sections 47 disposed about the circumference of the carousel, each tube section including a matching latch 48 hingedly attached thereto, at one end thereof, and having a releasable catch 49 at the opposite end thereof, to form a restraining assembly 50, which prevents inadvertent opening and movement of the buoys during flight.

Each assembly 50 is sized to accept a buoy therein, generally having a maximum inner diameter of about five inches, which approximates the diameter of a typical buoy. The number of section/latch assemblies 50 required is determined by the size of the carousel. For example, the storage carousel of FIG. 5 has a diameter sufficient to include, circumferentially, eight assemblies. In addition, the core 43 is of sufficient length, between the platform 44 and the hub 42, to accommodate the largest size buoy, which is approximately three feet long.

Generally, the buoys have about the same diameter, i.e. about five inches, but are of different lengths depending on the characteristics of the buoy. Consequently, to accommodate smaller sized buoys, a plurality of stacked assemblies are required, to form a storage station 51. Typical buoys are either 1, 2 or 3 feet in length. Consequently, four stacked assemblies, 50a, 50b, 50c, and 50d, are provided to form the storage station and support either one three foot buoy, one two foot with a one foot placed on top of it, or three one foot buoys. With this arrangement, between 8 and 24 buoys could be carried in the carousel, depending on the mix of buoys required on a particular mission. Of course, the number of assemblies and length of the carousel core depends on the space available within the aircraft cabin, and one or more carousels could be used per aircraft. In a helicopter with limited cabin space, one carousel which accommodates eight large buoys provides sufficient storage space to include a variety of buoys, allowing change in mission focus without returning to the launch site.

Figure 6:
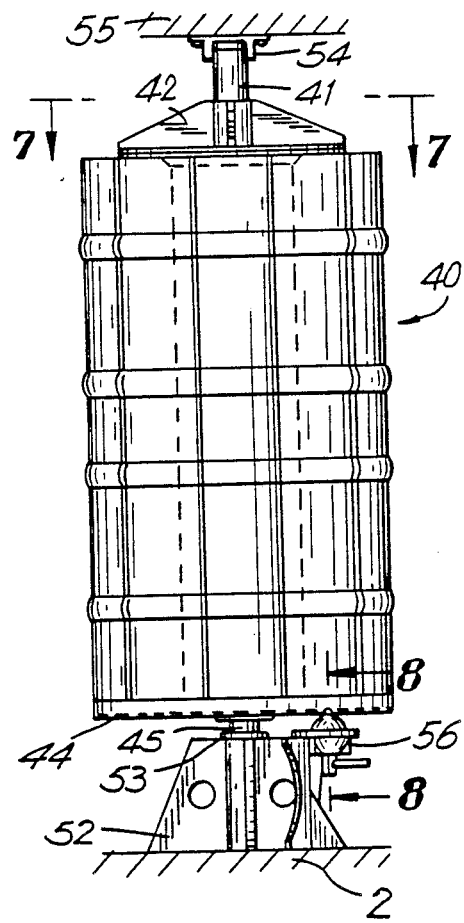
FIG. 6 is a view of the storage carousel mounted in an aircraft.
Figure 7:
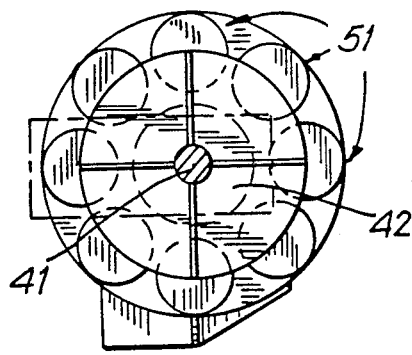
FIG. 7 is a top view of the storage carousel of FIG. 6.

Referring to FIGS. 6 and 7, the storage carousel 40 is shown mounted in a stationary base 52 which is fixed to the floor 2 of the aircraft, with the base 52 including a socket 53 wherein the lower shaft 45 of the carousel is freely rotatable. The upper shaft 41 is similarly rotatably supported in a socket 54, fixed to the aircraft cabin ceiling 55. A locking unit 56 is attached to the base 52 for preventing carousel rotation during flight to and from the operating area.

Figure 8:
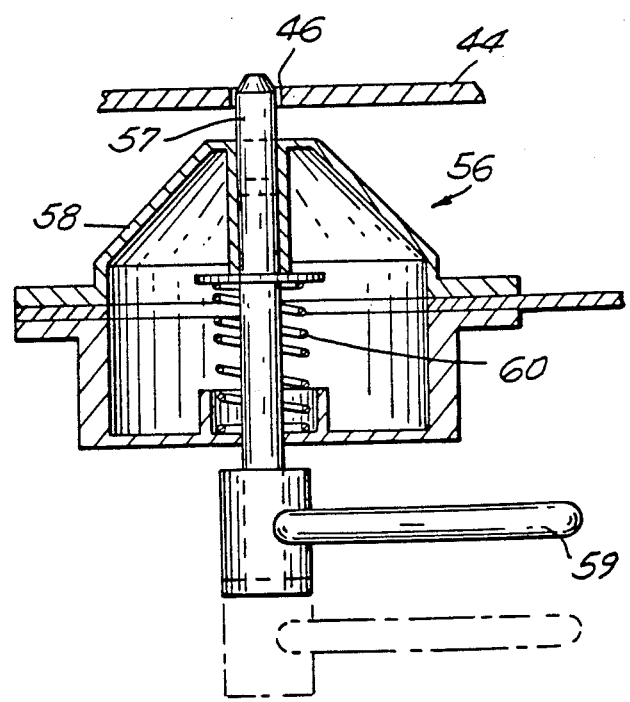
FIG. 8 is a cross-sectional view of the carousel locking mechanism.

Referring to FIG. 8, the locking unit 56 includes a shaft 57, extendible through a housing 58, the shaft matable with one of the locking holes 46 in the platform 44. The shaft 57 includes a handle 59 at the lower end thereof, with a spring 60, disposed in the housing 58, biasing the shaft 57 in the upward (engagement) direction. Once an operational area is reached, the handle 59 is pulled down to release the carousel for manual rotation to the storage station restraining the buoy to be launched. The catches 49 are then released and the buoy removed and placed in the gravity launcher. The locking unit 56 also provides a fail-safe as any movement of the carousel after it has been rotated to the desired position, will cause the shaft 57 to engage an adjacent locking hole, reactivating the locking system and thereby preventing inadvertent carousel rotation.

The storage carousel provides an opportunity for the operator to preset the desired functions on the buoy before loading into the launch tube, again maximizing flexibility by providing the operator an opportunity to modify settings as the mission dictates.

Utilizing a storage carousel for buoys in an aircraft allows ease in selection of buoys in flight within the restrictive confines of an aircraft cabin. In addition, the storage carousel configuration allows for storage of buoys of various lengths, providing flexibility in carrying various combinations of buoys to suit particular mission requirements. The additional storage capacity allows for continued discharge of buoys for a longer period depending on the number of additional buoys included, thereby extending the mission capability of the aircraft. The storage carousel also provides ease in setting of the buoy functions while the buoy is still securely held in the carousel. One advantage of the present invention is that the storage carousel may be a modular unit which can be interchanged with a preloaded carousel prior to launch, allowing for quick turnaround of the aircraft during refueling. The empty storage carousel could be removed and a full storage carousel installed with all the settings for the new buoys being set in flight to the operational area. Such a system would substantially increase the mission capability of the aircraft while maximizing the use of cabin space.

Utilizing the multi-store modular gravity launcher of the present invention provides for ease of installation and removal of the launcher from an aircraft. The launcher, including the extenders, is compatible with various lengths and diameters of buoys, and allows access by crew members to reconfigure the buoys arranged in the tube during flight to meet varying mission requirements. The launcher design also provides visual confirmation of proper loading and launching. While electrical actuation and control is used, the provision of a fully functional mechanical backup release system allows full operation of the launcher should an electrical malfunction occur, preserving the aircraft's ability to complete its mission. In a preferred embodiment, the launcher doors are oriented such that they open parallel to the forward air flow, providing launching capability up to 150 knots. The launcher design also facilitates maintenance due to the easy access to the interior of the launcher for repair or replacement of the launch mechanisms or electrical actuators.

While the preferred embodiments of the present invention have been described in relation to a gravity launch system and storage carousel disposed in a helicopter aircraft, it will be understood by those skilled in the art that the buoy deployment system can be disposed in other aircraft, and that the number of tubes in the launcher and number and quantity of tubes in the storage carrousels could vary depending on the requirements of the aircraft. While this invention is described in relation to various types of buoys, it will be understood by those skilled in the art that various changes in buoy size, type or configuration could be made without varying from the present invention.

What is claimed is:

1. A gravity launcher for discharging at least one object from an aircraft, the launcher comprising;
    a plurality of tubes, each tube sized to accept the object therein, each tube having open upper and lower ends thereof, the open upper end providing an access to the object placed within the tube and providing for reloading in flight, the tubes extending through a floor of the aircraft;
    door means, provided at the lower end of the tube, for preventing discharge of the object when in a closed position, and allowing discharge of the object in an open position;
    actuating means for opening and closing a door means; and,
    override means for opening and closing the door means on failure of the actuating means, the override means comprising a handle extending from a rod, attached to the actuating means, wherein the door means is manually actuatable by displacement of the handle and rod, the rod including recesses mateable with a lock arm, for locking the rod at various positions.

2. The launcher of claim 1 wherein the door means comprise door flaps.

3. The launcher of claim 1 further comprising at least one extender, slidably disposed in the tube and extendible therefrom, for increasing the effective length of the tube, thereby adapting the tube to accept variable length object therein.

4. The launcher of claim 1 wherein the door means includes a pin about which the door means is pivotable into and out of the closed position.

5. The launcher of claim 1 wherein the actuating means comprise an actuator, including a reciprocating piston extendible therefrom;
    a shaft, extending from the piston and including a cam follower at an end thereof;
    a cam link, in contact with the cam follower, and movable in response thereto;
    a lever arm, connected at one end to the cam link and movable therewith, and at the other end to the door means, movement of the cam link and lever arm opening and closing the door means.

6. The launcher of claim 5 wherein the actuator is electrically, hydraulically or pneumatically actuated.

7. The launcher of claim 6 wherein the actuator is electrically actuated.

8. The launcher of claim 5 wherein the cam link includes a spring arm, biasing the cam link into contact with the cam follower.

9. The launcher of claim 8 wherein the spring arm biases the cam link such that the door means is biased in the open position.

10. The launcher of claim 3 further comprising means for locking the extender in an extended position.

11. The launcher of claim 10 wherein the extender locking means comprise at least one slot in the extender sidewall, a locking spring, engageable with the slot for locking the extender at the desired position.

12. The launcher of claim 1 wherein the launcher includes two to twenty launch tubes.

13. The launcher of claim 12 wherein the launcher includes six launch tubes.

14. The launcher of claim 1 wherein the object is a buoy.

* * * * *